April 9, 1957 G. F. SCHERER 2,788,016
BALL VALVES
Filed May 11, 1951 2 Sheets-Sheet 1
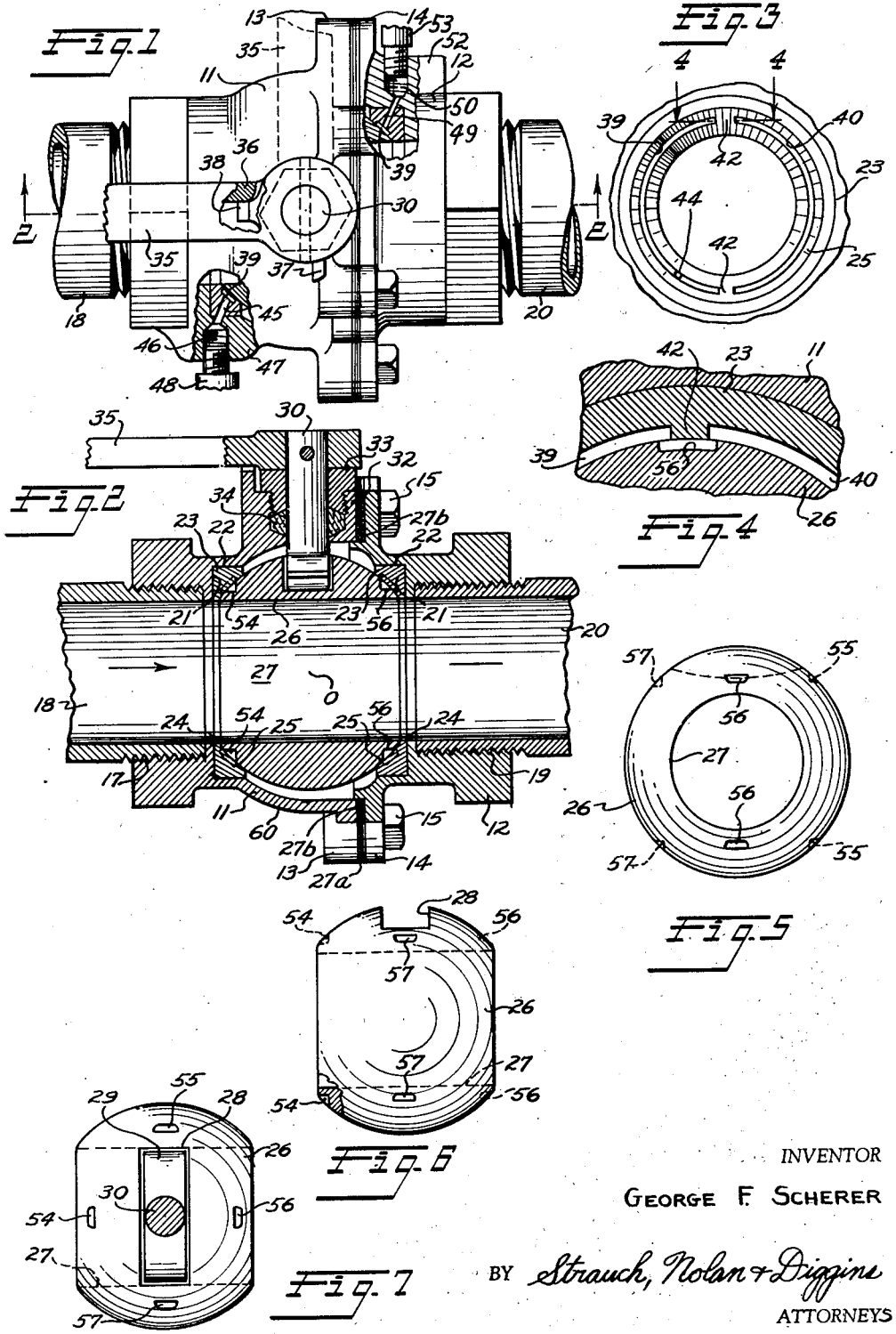
INVENTOR
GEORGE F. SCHERER
BY Strauch, Nolan & Diggins
ATTORNEYS

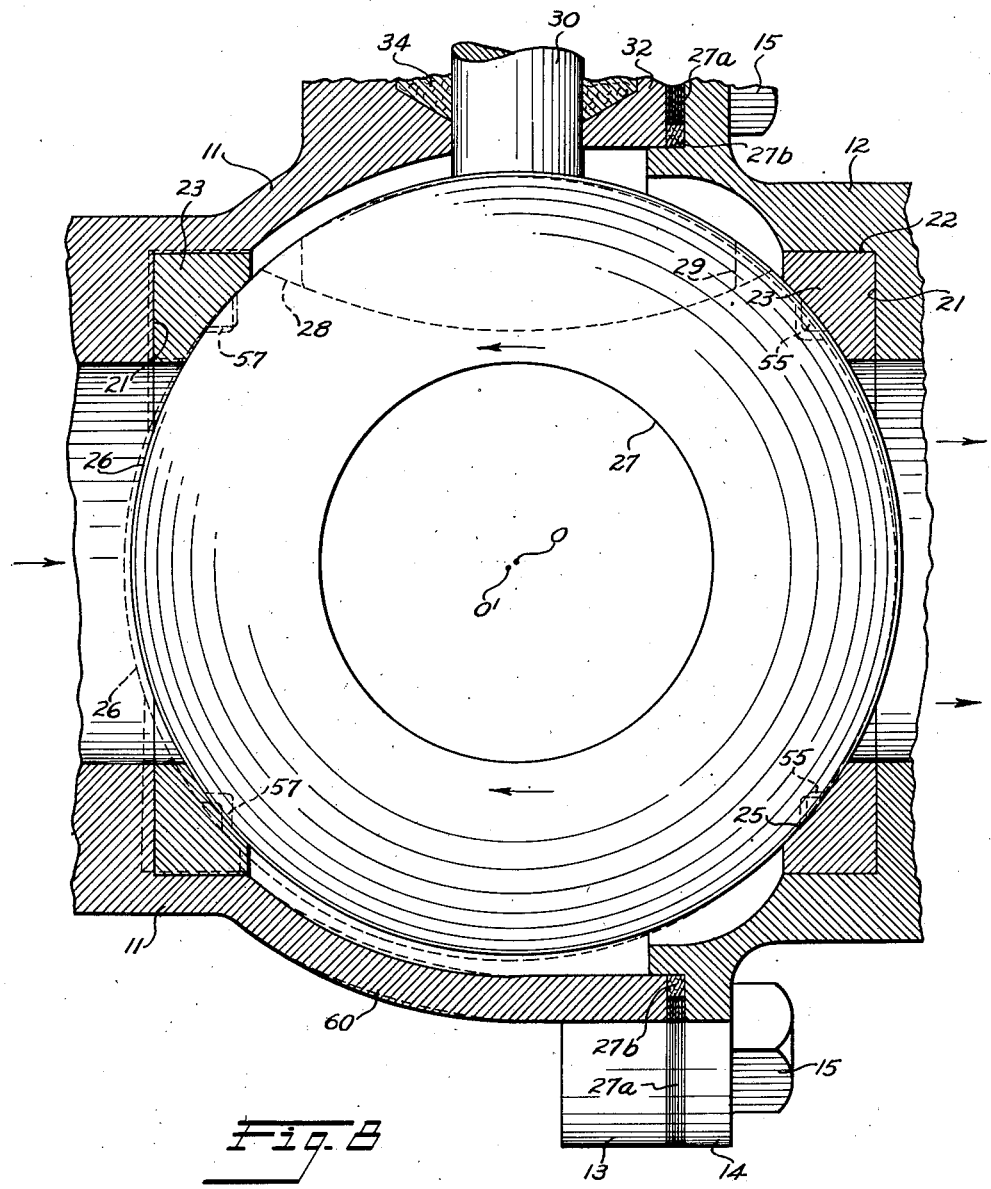

United States Patent Office 2,788,016
Patented Apr. 9, 1957

2,788,016

BALL VALVES

George F. Scherer, Oakland, Calif., assignor to Rockwell Manufacturing Company, Pittsburgh, Pa., a corporation of Pennsylvania Application May 11, 1951, Serial No. 225,840

2 Claims. (Cl. 137—246.19)

This invention relates to improvements in ball type valves for high pressure pipe line service and is particularly directed to a ball type valve wherein provision is made for supplying a plastic film of sealing material to both the upstream and downstream seats between the ball and valve body and wherein provision is made for jacking the ball from either seat through the medium of lubricant pressure, whereby the valve may be satisfactorily and easily operated as a two-way valve.

For a disclosure of such a ball valve of the one-way type, and a full discussion of the problems connected therewith and overcome thereby, reference may be had to my co-pending application Serial No. 138,030, filed January 11, 1950. The present invention is preferably an improvement upon this type of valve although it will become apparent to those skilled in the art that the invention may be applied with equal success to other and varied types of ball valves.

While the ball valve disclosed in application Serial No. 138,030, supra, embodies one of the most practical and satisfactory ball type valves yet discovered for high pressure pipe line use, it is designed solely for use as a one-way valve. It is also desirable and advantageous to have two-way ball type valves for some purposes, and it is accordingly a general object of my invention to provide such a valve.

In the two-way ball type valve embodied herein means are provided to insure lubricant plastic sealing which not only is of great advantage in maintaining a perfect seal at all times in either flow direction but is very important in enabling the easy operating characteristics as well-known in conventional tapered plug cocks. In addition, by employing a spherical ball and seat construction uniform distribution of seating load is obtained which enhances both the efficiency of lubricant sealing and the load carrying characteristics. A further important advantage of the invention herein is that the weight of the ball valve structure is very much less than that of a full round opening plug cock of equivalent pressure rating and size of bore, and this of course means a greatly reduced cost of manufacture.

Accordingly, it is a more specific object of my invention to provide a novel two-way ball valve structure of simple and inexpensive construction which is suitable for pipe line, and other high pressure services and which has a full round opening and adequate bearing areas with provision for both lessening the turning effort of the valve element and effecting a tight shut-off against the line fluid.

It is another object of my invention to provide a novel two-way ball type valve construction for high pressure and large pipe line services wherein the ball element has substantial metal to metal contact with both the upstream and downstream seats over a sufficiently wide annular spherical area to adequately support the thrust of the ball resulting from high line pressure in either direction, and special lubricant grooves are provided at the seating surfaces for providing a plastic sealing film to prevent leakage of line fluid past the valve.

A further object of my invention is to provide a novel two-way ball valve wherein lubricant grooves are provided about the ports in both valve seats and wherein provision is made for cutting off the supply of lubricant to the grooves which are connected to the lubricant reservoir when the valve is being turned between fully opened and fully closed position.

A still further object of my invention is to provide a lubricated two-way ball valve having provision for jacking the ball from whichever of its seats may be the downstream seat when the valve is in either open or closed position, or an intermediate position.

Another object of my invention is to provide a two-way ball valve wherein a slight amount of flexible adjustment may take place in the valve body so that the ball may be slightly displaced in the upstream direction when jacking is accomplished.

A further object of my invention is to provide a lubricated two-way ball valve which provides yielding means for jacking the plug off either valve seat to permit the establishment of a lubricant sealing film on the seat while in either the open or closed position.

A still further object of the invention is to provide a lubricated ball valve which will seat in either direction to form a leak-tight shut off without introducing springs or other yieldable means within the body structure which may become inoperative in certain kinds of service where extraneous dirt may lodge in the mechanism.

Another object of the invention is to provide a lubricated two-way ball valve wherein the seating surfaces and the lubricant grooves are not exposed to line fluid when the valve is in fully open or closed positions.

A further object of the invention is to provide a two-way ball valve having a separate lubricant reservoir for each valve seat.

A still further object of the invention is to provide a ball valve wherein the proper clearance between the ball and seating surfaces is simply and accurately obtained by means of a shim member positioned between the mating flanges of the body parts.

Further objects of the invention will become apparent as the description proceeds in connection with the appended claims and the annexed drawings wherein:

Figure 1 is a top plan view of a two-way ball valve constructed according to a preferred embodiment of the invention;

Figure 2 is a section substantially on lines 2—2 of Figure 1 illustrating the relation of the ball to its seats within the valve body;

Figure 3 is a fragmentary elevation of one of the seats within the body of the valve, particularly illustrating the lubricant grooves therein;

Figure 4 is an enlarged section along lines 4—4 of Figure 3 illustrating how each short groove of the ball bridges the associated seat lands;

Figure 5 is a side elevation of the ball as it appears looking inwardly from a fluid pipe line with the valve in fully opened position;

Figure 6 is a side elevation of the ball as it appears looking inwardly from a fluid pipe line with the valve in fully closed position;

Figure 7 is a top plan of the ball illustrating particularly the short grooves formed therein to bridge the lubricant grooves in the seats during fully opened and fully closed position of the valve; and Figure 8 is an enlarged elevation, partly in section, of the ball, seats and a portion of the valve body illustrating the resilient body deformation during jacking.

Referring to Figures 1–8, the valve body comprises two metal casing body parts 11 and 12 formed with integral radial flanges 13 and 14 joined together in a plane perpendicular to the pipe line axis by a series of bolt assemblies 15.

Main body part 11 is formed with a threaded bore 17 within which is connected the threaded end of a pipe 18 to one side of the line. Tail part 12 has an inwardly projecting shoulder portion piloted within the adjacent end of main body 11 and is formed with a threaded bore 19 of the same diameter and aligned with bore 17. Pipe 20 is secured in bore 19.

Inwardly of each of the bores 17 and 19 is a square cornered recess providing an axially facing flat annular shoulder 21 that is perpendicular to the common axis of the bores 17 and 19, and a substantially cylindrical wall 22 concentric with the bores. The seats for the ball valve, later to be described, comprise the annular metal inserts 23 in each recess. In the preferred embodiment, wherein the valve body parts are cast and of a brass composition, rings 23 are of steel pressed, shrunk or otherwise tightly fitted into the recess walls 22 with their outer flat sides flush with and backed by the shoulders 21.

Between the ends of pipes 18 and 20 and the shoulders 21 are the internal body flanges 24 whose inner diameters equal the pipe diameter.

Each insert ring 23 is formed on its inner side with an annular surface 25 which is sector of a sphere having its center on the pipe line axis as indicated at O in Figure 2.

The spherical ball element 26 is mounted within the casing body with its center coincident with point O and with opposite side sectors in metal to metal engagement with spherical seat areas 25 on the body. Preferably the external surface of the ball is chromium plated or hardened or made of corrosion resistant alloy for hardness against erosion and for reducing bearing friction. Ball 26 is illustrated in valve open position in Figure 2, with its through port 27 aligned with the side openings in the valve body. Port 27 is a symmetrical cylindrical bore which preferably has the same internal diameter as pipes 18 and 20, so that the valve body and ball provide a substantially constant diameter continuous passage with the pipes.

In manufacturing and assembling the ball valve of the invention it is highly important that proper clearance is established between ball 26 and seats 25 so that a satisfactory lubricant seal is maintained therebetween for successful valve operation. This means that the seats must not press against the ball as tightly as to bind it, nor should there be as much clearance that a proper lubricant seal is impossible. To establish the correct clearance without incurring difficult and costly machining operations, the valve is assembled in the following manner. With the body parts 11 and 12 unassembled, ball 26 is placed in the part 11 against the seat 25 thereof. Body part 12 is then set in position with its seat 25 also against the ball. In this position of the parts, body flanges 13 and 14 do not meet and a shim gage is inserted into the space therebetween and the measurement read off. To this measurement is added a predetermined small fraction of an inch, depending in amount upon valve size, to allow for proper lubricant sealing film between the ball and seats. This total measurement is the proper space between flanges 13 and 14 to give the correct clearance between ball and seats in the valve. Shims 27a of a thickness equalling said total measurement are then placed between flanges 13 and 14 (see Figs. 2 and 8) to properly locate them for correct clearance. As an example of the above procedure, if the initial measurement of the shim gage between the flanges is .007 inch when both seats are pressed against ball 26, and .001 inch should be allowed in the particular valve for lubricant film seal between ball and seats, this fraction will be added to .007 inch and shims .008 inch thick will be selected for use. As a practical matter, shims of a well-known type may be used which are, for example, .01 inch thick and marked for each .001 inch so that two such .001 inch layers may be peeled off to get a shim of the desired .008 inch thickness. Shim 27a may be one continuous annular member having properly spaced bolt holes, or there may be a shim for each bolt assembly 15.

Inwardly of the shim or shims 27a an annular sealing gasket 27b is inserted and this may be of the Garlock Guardian type or some other suitable seal. The sealing ring 27b is normally slightly thicker than the shim 27a so that it will be compressed into sealing relationship between the flanges when bolts 15 are tightened down to draw flanges 13 and 14 against the shim. In this manner shim 27a serves to locate the flanges and takes the bolt pressure while gasket 27b does the necessary sealing.

The top of ball 26 is formed with a straight sided surface recess 28 to loosely receive with a slidable fit a tang or key 29 integral with a rotatable stem 30 which, Figure 2, projects upwardly through a bonnet 32 externally of the body. A gland nut 33 threaded within the bonnet surrounds valve stem 30 and is tightened to compress the stem packing 34. Stem 30 may also be threaded into the valve body in the manner illustrated in my Patent No. 2,525,831, issued October 17, 1950, if desired. A suitable lever 35 non-rotatably secured upon valve stem 30 may be rocked between 90° apart valve open and closed positions as illustrated in Figure 1, stops 36 and 37 on the lever coacting with a stop 38 on the body for this purpose. When a stem of the type illustrated is used it is provided with collar (not shown) which mates with the interior of the body wall at the top of the valve to prevent the stem 30 from being blown out or, in other words, to maintain the necessary clearance between the end of the stem and the recess 28 in the ball 26. In the case of threaded stem valve, this clearance is taken care of by the depth to which the threaded stem is screwed into the body.

Ball 26 is therefore mounted for rotation on the seats 25 and has a floating tang and a slot connection with the valve stem 30 which is rotatable about an axis that intersects the point O at right angles to the pipe line axis, so that ball 26 rotates about the axis of stem 30 during operation with its surface normally in contact with both of the seats 25. In addition, it is necessary that the mating surface between the end of the stem tang 29 and the bottom of the recess 28 provide some clearance, referred to just above, to prevent jamming the ball 26 on its seats and also to prevent a sideways displacement of the plug rotating about the point O. In other words, while the ball 26 is positioned between the seats 25 some means must be provided to prevent it from rotating about the pipe line axis or an axis normal to this axis in a horizontal plane and passing through point O. It is prevented from doing so in one direction by the mating of the side walls of the tang 29 and recess 28; however, it must also be prevented from rotating in a direction normal to this, and this is determined by the clearance between the mating surfaces of the bottom of the tang and bottom of the recess. This is true whether the recess 28 is milled out on a straight line or on a curvature which would normally be used simply to provide sufficient depth of the recess and yet not interfere with, or cut into, the lubricant grooves in the seats or short grooves in the ball. Normally it is estimated that this clearance should be from $1/32$–$1/16$ of an inch depending upon the size of the valve and the precision with which it is assembled.

In assembling the valve the stem 30 is inserted into valve body part 11 with the tang 29 running parallel to the axis of the pipes 18 and 20 and then the ball 26 with its recess 28 also parallel to the axis of the pipes is lowered into contact with the body seat 25, after which if the stem is of the threaded type it is then rotated until the proper clearance is obtained at the bottom of the tang and ball recess. It will be obvious that the size of opening in the body parts must be sufficient to permit insertion of the ball 26 and assembly in this manner.

Lubricant, which is preferably a conventional plug valve lubricant, is introduced into either of the valve seats to provide an annular plastic sealing film between the valve ball and smooth surfaces 25. This is accomplished by grooving the surfaces as illustrated in Figure 3 and providing a source of lubricant connected to the grooving.

Referring to Figure 3 which illustrates the left hand ring as viewed from inside the body, surface 25 of each insert ring 23 is formed with two shallow grooves 39 and 40 of the same size that are each substantially semicircular and separated only by a pair of short lands 42 that comprise extensions of surface 25. Lands 42 are diametrically opposite and preferably of the same size and are located at the top and bottom of insert rings 23. An opening 44 is in the bottom of groove 39 in the left hand insert ring 23. Opening 44 in the left hand ring 23, Figures 1 and 3, communicates with a body passage 45 of the same size that extends to a lubricant reservoir space 46 within a side boss 47 on the body part 11. Boss 47 is internally threaded to receive a lubricant compressor screw 48. Figure 3 also represents the appearance of the right hand ring 23 as viewed from the interior of the body. The opening 44 in groove 39 of the right hand ring 23 is on the opposite side of the axis as shown in Figure 1 and communicates with a body passage 49 of the same size that extends to a lubricant reservoir space 50 within a side boss 52 on body part 12. Boss 52 is internally threaded to receive a lubricant compressor screw 53 as in the left hand reservoir space and boss.

Referring now to Figures 5-7, the surface of ball 26 is provided with four pairs of upper and lower short, shallow grooves 54, 55, 56 and 57. The groove pairs 54 and 56 are located equidistantly above and below ball ports 27 at each end thereof so as to be cooperatively aligned with the pair of lands 42 in each valve seat 25 when the valve ball 26 is in open valve position. Similarly, the pairs of grooves 55 and 57 which are displaced 90° about the axis of stem 30 are so located as to be aligned with the pair of lands 42 in each valve seat when the ball has been rotated to fully closed position.

The grooves 54, 55, 56, and 57, although short, are long enough to bridge the land 42 when associated therewith as illustrated in Figure 4, and therefore function to connect grooves encircling the valve ports on each side when the valve is substantially completely open or completely closed, and also provide means for disconnecting the exposed grooves 40 from the reservoir when turning past the plug port.

When stick lubricant is placed in the reservoirs 46 and 50 it may be pressurized and displaced into the grooves 39 by rotating screws 48 and 53, respectively. Only when the ball 26 is in either of its 90° limit positions of full closed or full open do the short grooves on the ball effectively communicate groove 39 with groove 40 so as to connect groove 40 with the lubricant supply. While the ball is being rotated between its fully opened and closed positions, neither of the seat grooves which are in communication with their lubricant reservoirs is exposed to the plug port and the line fluid so there is negligible loss of lubricant from these grooves even when lubricant pressure is applied to jack the plug while it is stuck in an intermediate position. The spherical ball, moreover, adapts itself to optimum sealing position on the seats in all degrees of rotation since it is substantially floating mounted between the two valve seats.

Increase of lubricant pressure in the lubricant systems when the ball is in open or closed position, as by turning screws 48 and/or 53, fills the groove systems entirely and spreads lubricant over the bearing seats and applies a balanced lateral pressure to the ball over the substantially continuous circular areas surrounding the port openings. All force components of this pressure combine to oppose and neutralize each other when the pressure is equal in each lubricant system. However, with greater pressure in one or the other of the lubricant systems, the force components parallel to the pipe line axis will combine to displace the ball from the seat where the greater pressure is applied, generally the downstream seat, and toward the opposite or upstream seat against the upstream fluid pressure due to the flexing of the body which provides the yielding means necessary.

A plastic sealing film of the lubricant under pressure is extruded from the grooves 39 and 40 in either valve seat 25 into the spaces between the seat and the adjacent surface of ball 26, hereby providing a fluid tight seal entirely about the valve opening. Should ball 26 have been frozen to whichever seat 25 happens to be the downstream seat, as by corrosion or electrolytic action, increased pressure exerted through the lubricant will free the ball and displace more lubricant into the space between the seating surfaces. This upstream displacement or jacking of the ball may take place in either direction in my improved ball valve depending upon the direction of flow of line fluid at a particular time, and is permitted by the manner of connecting the ball with stem 30 and the deformable construction of the valve body itself.

The valve body flexure during jacking is best shown in Figure 8 which illustrates in an enlarged elevation how the jacking actually occurs. It is assumed in Figure 8 that the right hand seat 25 is the downstream seat so that the jacking of the ball 26 will normally be to the left or towards the upstream side. As has been pointed out hereinbefore, the jacking is accomplished by increasing lubricant pressure in one of the lubricant systems, which in this illustration will be the right hand system and particularly the grooves of the right hand seat 25. As the lubricant pressure is increased the horizontal components of the hydraulic force exerted against the ball will force it to the left and away from the right hand seat 25. Since the ball in its normal condition is in contact with both of its seats as is shown in Figure 2 and by the solid lines in Figure 8, there must be a deformation or yield at some point in the valve to allow for this leftward displacement of the ball. The yielding means is provided by the flexure of the body structure and is actually a definite bending moment owing to the structural form of the body. This may be best seen at the relatively narrow bottom portion 60 of the body part 11. As indicated by the dash lines of Figure 8 the portion 60 will be "stretched" out or forced to have less curvature, and correspondingly the left hand seat 25 and body portion are moved slightly to the left relative to the right hand seat as shown by the dash lines. The ball itself which under hydraulic pressure causes this body flexure will have been displaced as indicated by the dash lines and its center will have moved approximately from O to O'. In actual practice in the illustrated embodiment the ball 26 will not be displaced in a purely horizontal direction but will also move slightly downward as though it were pivoted slightly about the upper portion of its left hand seat 25. This slight downward component or rotational effect is due to the bending moment of the valve body in which displacement of left hand seat 25 will be somewhat greater at its bottom than at its top since greater body deformation is possible in the bottom portion 60 than in the thicker and reinforced upper body portion.

The displacement of the ball 26 in the foregoing manner is permitted due to the tongue and key connection between the ball and the stem 30 which is provided with sufficient "play" or looseness to allow relative movement between the ball and stem. However, due to the spherical nature of the seating surfaces the ball is still in uniform contact over the entire seat. Figure 8 illustrates jacking in one direction only but it will be understood that the jacking and ball displacement may be accomplished in the same manner in the opposite direction. It should be understood also that Figure 8 necessarily illustrates an exaggerated amount of displacement for reasons of clarity, and that in actual practice any ball displacement and consequent body deformation which takes place is in the nature of several thousandths of an inch which amount of resilient deformation has been found to be entirely feasible with the body materials used and construction I have shown with no permanent deformation or injury to the body parts.

For example, four inch round opening experimental valves embodying the invention which are subject to 2,000 p. s. i. internal line pressure exhibit a linear extension of the body when in shut off position of about .0015 to .0035 of an inch measured between the end flanges. This internal pressure amounts to about 25,000 p. s. i. total linear thrust on the downstream seat. Any conceivable pipe line stresses due to weight of piping or constructional design would be far less than this. With large valves and greater weight the design of the valve (wall thickness ) would provide for proportionately greater resistance to line strains.

Since all the jacking pressure must be provided by lubricant in grooves 39 and 40 I make grooves 39 and 40 sufficiently wide to give the required lift. Allowing for a reasonable lubricant pressure of about 5,000 p. s. i. the total area of the grooves would have to be 5 square inches to provide 25,000 lbs. total lift. For example, for a ball valve having a four inch port used in line service up to 2,000 p. s. i. I have found it satisfactory to provide lubricant grooves having a width of about three sixteenths of an inch and a groove depth of about one-sixteenth of an inch. This provides ample total applied pressure on the ball for jacking it from its seat with full 2,000 p. s. i. pressure on the plug in closed position. For larger valves in lines carrying other pressures the grooves will be proportioned accordingly since the total lift required is the area of the grooves in either seat times the unit lubricant pressure.

I have therefore provided a two-way ball type valve that is adapted for high pressure service. This is the first two-way ball type valve to my knowledge employing metal seating surfaces for carrying high line pressures and yet not leak a drop at 2,000 p. s. i. gas pressure. I have found that provision of the lubricant film provides both easy operation torques and complete sealing against leakage. This is also the first two-way ball type valve to my knowledge wherein the ball may be jacked from either seat by lubricant pressure to free a ball that is stuck and to lessen the torque required to turn the valve. The lubricated valve above described does not leak and may be turned easily even at line pressures of 2,000 p. s. i. When not lubricated, this valve leaks copiously at line pressures of one hundred and fifty pounds per square inch and the turning effort is considerably greater than when lubricated. Heretofore in valves of this type flexible inserts of asbestos-rubber composition were generally used to secure shut off against leakage and when these seats are employed the valves cannot be operated when under high differential line pressures.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid flow control valve assembly, a valve casing comprising separable parts, means for rigidly securing said casing parts together, a port opening in each said casing part coaxial with the axis of fluid flow through said valve assembly, individual rigid seat rings fixedly mounted in the respective casing parts so as to be axially backed by said parts and to surround said ports, each said seat ring having a continuous sperically curved surface symmertical about said flow axis and facing internally of said casing, a ball mounted in said casing for rotation about an axis normal to said flow axis and having on opposite sides continuous spherically curved surfaces that seat on said internal seat ring surfaces during rotation of the ball between open and closed positions, a through port in said ball that is aligned with said casing ports when the valve assembly is open, a valve stem journaled in one of said casing parts and having a detachable connection with said ball, and means for introducing plastic sealing material under pressure directly through said seat rings and between either pair of spherical ball seating surfaces for separating said surfaces to provide a layer of said material therebetween and free them if stuck together, said casing parts being so constructed and arranged to provide deformation of the casing mainly axially of said fluid flow axis when a predetermined ball jacking pressure is applied to the sealing material at said seating surfaces.

2. In a fluid flow control valve assembly, a valve casing, opposed port openings in said casing coaxial with the axis of fluid flow through said valve assembly, individual rigid seat rings rigidly mounted in the casing so as to be axially backed thereby and to surround said port openings, each said seat ring having a continuous spherical curved surface symmetrical about said flow axis and facing internally of said casing, a ball mounted in said casing for rotation about an axis normal to said flow axis and having on opposite sides continuous sperically curved surfaces that seat on said internal seat ring surfaces during rotation of the ball between open and closed positions, a through port in said ball that is aligned with said casing ports when the valve assembly is open, a valve stem journalled in said casing and having a detachable connection with said ball, and means for introducing plastic sealing material under pressure through said seat rings and between either pair of spherical ball seating surfaces for separating said surfaces to provide a layer of said material therebetween and free them if stuck together, said casing being so constructed and arranged as to provide deformation of the casing mainly axially of said fluid flow axis when a predetermined ball jacking pressure is applied to the sealing material at said seating surfaces.

References Cited in the file of this patent

UNITED STATES PATENTS

| Number | Name | Date |
|---|---|---|
| 117,704 | Warren | Aug. 1, 1871 |
| 548,518 | Casey | Oct. 22, 1895 |
| 982,815 | Hobbs | Jan. 31, 1911 |
| 1,616,386 | O'Stroske | Feb. 1, 1927 |
| 1,770,900 | Dawson | July 22, 1930 |
| 1,906,266 | Hoffman | May 2, 1933 |
| 2,175,867 | Ballard | Oct. 10, 1939 |
| 2,333,424 | Humphreys | Nov. 2, 1943 |
| 2,433,638 | Volpin | Dec. 30, 1947 |

FOREIGN PATENTS

| Number | Country | Date |
|---|---|---|
| 464,744 | France | of 1914 |
| 446,187 | Great Britain | Apr. 27, 1936 |